C. W. MERRILL.
PROCESS OF PRECIPITATING AND RECOVERING MATERIALS FROM SOLUTIONS.
APPLICATION FILED NOV. 23, 1906. RENEWED JULY 29, 1908.
900,186.
Patented Oct. 6, 1908.
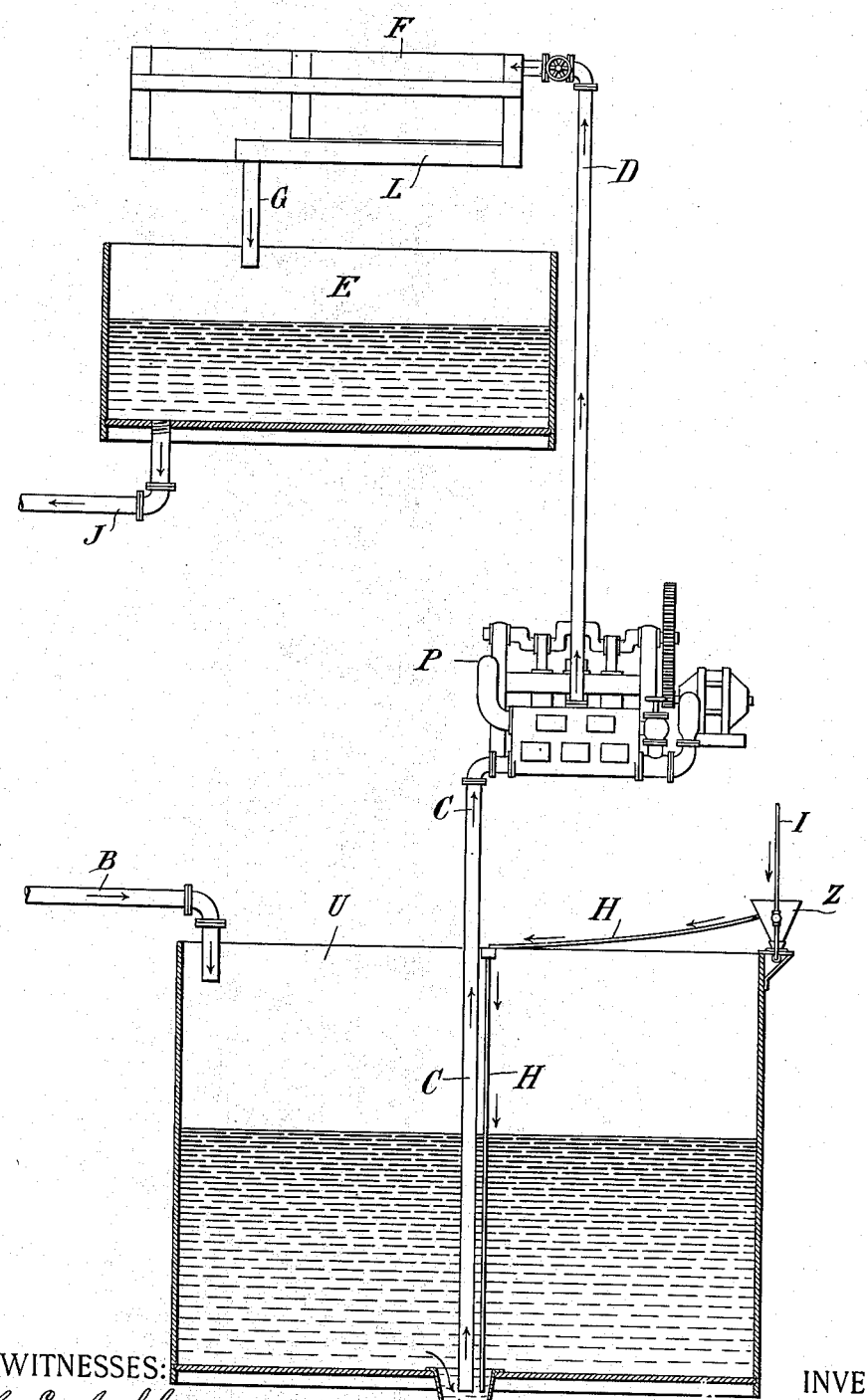

UNITED STATES PATENT OFFICE.

CHARLES W. MERRILL, OF LEAD, SOUTH DAKOTA.

PROCESS OF PRECIPITATING AND RECOVERING MATERIALS FROM SOLUTIONS.

No. 900,186.     Specification of Letters Patent.     Patented Oct. 6, 1908.

Application filed November 23, 1906, Serial No. 344,701. Renewed July 29, 1908. Serial No. 445,926.

*To all whom it may concern:*

Be it known that I, CHARLES W. MERRILL, a citizen of the United States, and resident of Lead, county of Lawrence, and State of South Dakota, have invented a new and useful Improvement in Processes of Precipitating and Recovering Materials from Solutions, of which the following is a specification.

My invention relates to an improved process of precipitating and recovering valuable materials from solution, and particularly metals from hydro-metallurgical solutions.

In practice, metallic zinc bearing materials or sulfids of zinc have heretofore been used to precipitate metals from cyanid solutions by agitating such precipitants from such solutions in an open tank and subsequently passing the mixture through a filter. This method is open to many disadvantages, among others that the precipitant must remain in contact with the solution for the whole period required to remove the mixture from the tank and by reason thereof the mixture comes in contact with the atmosphere during the said period. Again, an unnecessarily large amount of precipitant is dissolved by the solution during this period, and an unnecessarily large amount of solvent, such as alkali or alkaline earth metal cyanid is decomposed during said period. A re-dissolving of the precipitate takes place during said period, and the loss of chemicals and the re-solution which is in many cases promoted by the contact with the atmosphere during the said period is a matter of considerable importance. Moreover, it has been ascertained that in practice, in agitating the mixture of precipitant and solution and subsequently withdrawing the mixture, after a portion of the mixture has been withdrawn, a re-solution of the precipitate, particularly in the upper zone of the mixture in the tank, has taken place. Now, I have discovered that when a suitable precipitant is added to a moving body of solution such as a metal bearing cyanid solution, and the mixture is conducted without rest or without contact with the atmosphere, or both, to a filter, preferably a pressure filter of the type described by me in the application heretofore filed by me in the United States Patent Office under Serial Number 322,388, that most of the disadvantages above referred to are obviated and very much more efficient results are produced.

In case collecting tanks are introduced between the containers in which the dissolution, particularly of the precious metals from the crushed ore, takes place, and the filter, I add the precipitant to the solution as it leaves the collecting tank or at some point between the collecting tank and the filter, or I may add it to the filter direct. In the absence of collecting tanks, I add the precipitant to the moving solution at some point between the crushed ore and the filter, or to the filter direct.

In practice cyanid solutions resultant from the treatment of ores contain, in addition to the gold and allied metals, another group such for example as silver, lead, mercury, etc., which may be precipitated, at least in part, as sulfids. In some such cases it is very desirable to precipitate the latter group, at least in part, before proceeding to precipitate the gold, the remaining silver, and other metals. This I accomplish by the addition of a sulfid soluble in solutions of an alkali or an alkaline earth metal cyanid which is added either directly as an alkaline sulfid or formed in the cyanid solution to be precipitated, and containing free alkali, by the addition of hydrogen or other sulfid, the effect of which is to precipitate some of the metals at least in part as sulfids before the precipitation of the gold and other unprecipitated metals, and also to re-combine the cyanogen thus liberated as an alkali metal or alkaline earth metal and leave the solution in better condition for the precipitation of the remaining metals by the second precipitant.

After the aforesaid metals have been eliminated at least in part, and gold and other unprecipitated metals only are present, I precipitate them by any precipitant which may be found, from time to time, convenient.

In practice, I prefer to use a zinc bearing material, as a precipitant such as finely divided zinc, or sulfid of zinc, or both.

The conduct of the process will be best understood by reference to the accompanying sheet of drawings forming a part of this specification, in which similar letters refer to similar parts throughout the said several views.

In said drawings, U is the receiver for the unprecipitated solution, and Z the receiver for the precipitant.

H is the duct through which the precipitant is conveyed to the unprecipitated solution in motion, shown, in this case, leading to the sump S.

C is the suction pipe of the pump. P and D the discharge pipe of the same.

F is a filter press shown, in this case, with the feed inlet at the top and with open delivery into the launder L, which discharges into the receiver E for precipitated solution.

The particular method which I prefer to use is as follows: The receiver U having been filled with solution, the precipitant in the shape of an emulsion or solution is added to the receiver Z. A flow of liquid is then started through the pipe I to the bottom of the receiver Z which then discharges its contents gradually through the duct H which leads to a point adjacent to the inlet of the suction pipe C. The pump is then started and the mixture of solution to be precipitated and the precipitant is drawn into the suction pipe C, thence through the pump P, thence through the discharge pipe D, and thence through the filter F, which retains the precipitate and permits the precipitated solution to pass into the launder L and thence to the receiver E.

I do not limit myself to any particular method of conducting the unprecipitated solution from the container in which the dissolution takes place to the filter, nor do I limit myself to adding the precipitant at any point along the duct through which the effluent unprecipitated solution passes from the dissolving container to the filter; nor do I limit myself to the use of the precipitant in a liquid or emulsified form, but may add it dry

I claim as my invention:

1. The process for precipitating and recovering material from its solution which consists in adding a precipitant to said solution while in motion, conducting the mixture without rest to a filter, and separating the solid from the liquid in said filter.

2. The process for precipitating and recovering material from its solution which consists in adding a precipitant to the duct through which said solution is being conveyed to a filter and separating the solid from the liquid in said filter.

3. The process for precipitating and recovering material from its solution which consists in conveying said solution to a pressure filter, simultaneously forcing a precipitant into said pressure filter with said solution and separating the solid from the liquid in said filter.

4. The process for precipitating and recovering material from its solution which consists in adding a precipitant to the duct in which said solution is conveyed, forcing the mixture into the bottom of a pressure filter, and separating the solid from the liquid in said filter.

5. The process for precipitating and recovering material from its solution, which consists in adding a precipitant to a solution in motion at a point adjacent to the outlet of said solution from a receiver, forcing the mixture through a pressure filter, and separating the solid from the liquid in said filter.

6. The process for precipitating and recovering material from its solution which consists in adding a precipitant to said solution in motion, conveying the mixture to a filter, and separating the solid from the liquid in said filter, all the while excluding the mixture from contact with the atmosphere.

7. The process for precipitating and recovering material from its solution which consists in adding a precipitant to said solution in motion at a point adjacent to the suction pipe of a pump, thence pumping the mixture to the bottom of a pressure filter, and separating the solid from the liquid in said filter.

8. The process for precipitating and recovering material from its solution which consists in adding a precipitant to said solution in motion at a point adjacent to the suction pipe of a pump, thence pumping the mixture to the bottom of a pressure filter and separating the solid from the liquid in said filter, all the while excluding the mixture from contact with the atmosphere.

9. The process for precipitating and recovering metals from a cyanid solution which consists in adding an emulsion of finely divided zinc to said solution while in motion, conducting the mixture without rest to a filter, and separating the solid from the liquid in said filter.

10. The process for precipitating and recovering metals from cyanid solutions which consists in adding an emulsion of finely divided zinc to said solution while in motion conducting the mixture to a filter and separating the solid from the liquid in said filter, all the while excluding the mixture from contact with the atmosphere.

11. The process of precipitating and recovering metals from cyanid solutions which consists in mixing finely divided zinc with a liquid in a receiver, adding a liquid continuously to said receiver, discharging the emulsion from said receiver into said solution in motion, conducting the mixture without rest to a filter, and separating the solid from the liquid in said filter.

12. The process for precipitating and recovering metals from cyanid solutions which consists in mixing finely divided zinc with a liquid in a receiver, adding a liquid continuously to said receiver, discharging the emulsion from said receiver into said solution in motion, conducting the mixture without rest to the bottom of a converging pressure filter, and separating the solid from the liquid in said filter.

13. The process for precipitating and recovering metals from cyanid solutions, which consists in adding a sulfid soluble in solutions of an alkali or an alkaline earth metal cyanid to said solution, whereby certain of the metals contained therein, are precipitated at least in part subsequently adding to the solution a suitable precipitant for precipitating the gold and other unprecipitated metals, conducting the mixture to a filter, and separating the solid from the liquid in said filter.

14. The process for precipitating and recovering metals from cyanid solutions which consists in first adding a sulfid soluble in solutions of an alkali or an alkaline earth metal cyanid to said solution and subsequently adding finely divided zinc to said solution conducting the mixture to a filter and separating the solid from the liquid in said filter.

15. The process for precipitating and recovering metals from cyanid solutions which consists in first adding a sulfid soluble in solutions of an alkali or an alkaline earth metal cyanid to said solution and subsequently adding finely divided zinc to said solution conducting the mixture without rest to a filter and separating the solid from the liquid in said filter.

16. The process for precipitating and recovering metals from cyanid solutions which consists in first adding a sulfid soluble in solutions of an alkali or an alkaline earth metal cyanid to said solution and subsequently adding finely divided zinc to said solution conducting the mixture excluding the atmosphere therefrom to a filter and separating the solid from the liquid in said filter.

17. The process for precipitating and recovering metals from cyanid solutions which consists in first adding a sulfid soluble in solutions of an alkali or an alkaline earth metal cyanid to said solution and subsequently adding finely divided zinc to said solution conducting the mixture without rest and without contact with the atmosphere to a filter and separating the solid from the liquid in said filter.

18. The process for precipitating and recovering metals from cyanid solutions which consists in adding a sulfid soluble in solutions of an alkali or an alkaline earth metal cyanid to said solution whereby certain of the metals contained therein are precipitated, conducting this mixture to a filter, separating the solid from the filtrate in said filter, subsequently adding to the filtrate a suitable precipitant for precipitating the gold and other unprecipitated metals, conducting this mixture to a filter and separating the solid from the liquid in said filter.

In testimony, that I claim the foregoing as my invention, I have signed my name in presence of two witnesses, this 16th day of November 1906.

CHARLES W. MERRILL.

Witnesses:
S. MERRILL,
WM. HAMMOND, Jr.